United States Patent
Hendrix et al.

(10) Patent No.: US 10,749,249 B2
(45) Date of Patent: Aug. 18, 2020

(54) DISPLAY PANEL WITH INTEGRATED SMALL CELL AND BILLBOARD WITH INTEGRATED MACRO SITE

(71) Applicant: CommScope Technologies LLC, Hickory, NC (US)

(72) Inventors: Walter Mark Hendrix, Richardson, TX (US); Julian R. Colapietro, McKinney, TX (US); Naiara Nafarrate Mendez, Muskiz (ES); Michael J. Paulus, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/469,695

(22) Filed: Mar. 27, 2017

(65) Prior Publication Data
US 2017/0324154 A1    Nov. 9, 2017

Related U.S. Application Data

(60) Provisional application No. 62/331,695, filed on May 4, 2016.

(51) Int. Cl.
*H01Q 1/24*    (2006.01)
*H01Q 21/20*   (2006.01)
(Continued)

(52) U.S. Cl.
CPC ........... *H01Q 1/246* (2013.01); *H01Q 1/1228* (2013.01); *H01Q 1/1242* (2013.01); *H01Q 1/42* (2013.01);
(Continued)

(58) Field of Classification Search
CPC ........ G09F 9/375; G09F 9/33; G09F 15/0037; G09F 19/02; G09F 19/22; G09F 9/3026;
(Continued)

(56) References Cited

U.S. PATENT DOCUMENTS 5,049,891 A * 9/1991 Ettinger .................. H01Q 1/28
343/705
5,612,741 A * 3/1997 Loban .................... G03B 21/10
348/383
(Continued)

FOREIGN PATENT DOCUMENTS

CN    201515001 U    6/2010
CN    201918491 U    8/2011
(Continued)

OTHER PUBLICATIONS

Notification of Transmittal of the International Search Report and the Written Opinion of the International Searching Authority, or the Declaration corresponding to International Application No. PCT/US2017/030854; dated Aug. 8, 2017.
(Continued)

*Primary Examiner* — Linh V Nguyen
(74) *Attorney, Agent, or Firm* — Myers Bigel, P.A.

(57) ABSTRACT

Aspects of the present disclosure are related to digital display devices and base stations such as small cell base stations, which may include at least one antenna and a radio. More specifically, digital display devices are being increasingly deployed in airports, along roads and highways, in shopping malls, in rural or highly urban areas where additional cellular coverage is desirable. These digital display devices provide desirable mounting locations for cellular equipment because they are already powered. One or more components of the base station may be concealed from view by a concealment device to satisfy aesthetic or design requirements. In some aspects, this concealment device may be a fabric radome. In some aspects, the concealment device may be the digital display device itself, because the digital display device is dimensioned such that at least some
(Continued)

components of the base station may be hidden behind or within the digital display device.

12 Claims, 7 Drawing Sheets (51) Int. Cl.
| | | |
|---|---|---|
| *H01Q 1/12* | (2006.01) | |
| *H01Q 1/42* | (2006.01) | |
| *H01Q 21/28* | (2006.01) | |
| *H01Q 3/04* | (2006.01) | |
| *H04B 7/04* | (2017.01) | |
| *H04W 16/28* | (2009.01) | |
| *H04W 88/08* | (2009.01) | |

(52) U.S. Cl.
CPC ............. *H01Q 1/427* (2013.01); *H01Q 3/04* (2013.01); *H01Q 21/205* (2013.01); *H01Q 21/28* (2013.01); *H04B 7/04* (2013.01); *H04W 16/28* (2013.01); *H04W 88/08* (2013.01)

(58) Field of Classification Search
CPC .... G09F 7/18; G09F 15/0012; G09F 15/0018; G09F 15/0025; G09F 2013/0472; H01Q 1/246; H01Q 1/1228; H01Q 1/427; H01Q 3/04; H01Q 1/1207; H01Q 1/42; H01Q 1/44
USPC ........................................................ 343/702
See application file for complete search history.

(56) References Cited

U.S. PATENT DOCUMENTS

| | | | |
|---|---|---|---|
| 5,926,145 A | 7/1999 | Honma | |
| 6,222,503 B1 | 4/2001 | Gietema et al. | |
| 7,671,814 B2 | 3/2010 | Savage et al. | |
| 8,254,338 B2* | 8/2012 | Anschutz | G06Q 30/02 370/332 |
| 9,781,246 B2* | 10/2017 | Das | H04W 4/33 |
| 2004/0164911 A1* | 8/2004 | Sun | G06F 1/1616 343/702 |
| 2005/0282586 A1* | 12/2005 | Rutherford | H01Q 1/1207 455/562.1 |
| 2006/0070281 A1 | 4/2006 | Passannante | |
| 2008/0089288 A1* | 4/2008 | Anschutz | G06Q 30/02 370/331 |
| 2009/0135074 A1* | 5/2009 | Yang | H01Q 1/246 343/766 |
| 2010/0231469 A1 | 9/2010 | Kim | |
| 2014/0217248 A1* | 8/2014 | Kato | H01Q 1/12 248/162.1 |
| 2014/0267896 A1* | 9/2014 | Cox | H04N 5/63 348/383 |
| 2015/0031372 A1 | 1/2015 | Foerster et al. | |
| 2015/0177374 A1 | 6/2015 | Driscoll et al. | |
| 2015/0303585 A1* | 10/2015 | Chistyakov | H01Q 21/0006 343/853 |
| 2015/0349399 A1* | 12/2015 | Lasier | H01Q 1/1242 343/721 |
| 2015/0371571 A1* | 12/2015 | Hager | H04W 88/08 348/552 |
| 2017/0352952 A1* | 12/2017 | Weiler | H01Q 1/2283 |
| 2018/0062247 A1* | 3/2018 | Umbert | G09F 15/0043 |
| 2018/0102833 A1* | 4/2018 | Ling | H04H 60/92 |

FOREIGN PATENT DOCUMENTS

| | | |
|---|---|---|
| CN | 2309600 Y | 1/2012 |
| CN | 202749055 U | 2/2013 |
| CN | 203573598 U | 4/2014 |
| CN | 204315209 U | 5/2015 |
| CN | 204665082 U | 9/2015 |
| JP | 2005283889 A | 10/2005 |
| JP | 3185100 U | 8/2013 |
| WO | 2014132233 | 9/2014 |
| WO | WO 2016/040745 A1 | 3/2016 |

OTHER PUBLICATIONS

Extended European Search Report issued in corresponding European Patent Application No. 17793259.7, dated Feb. 17, 2020 (9 pages).

* cited by examiner

DISPLAY PANEL WITH INTEGRATED SMALL CELL AND BILLBOARD WITH INTEGRATED MACRO SITE

CROSS-REFERENCE TO RELATED APPLICATION

This application claims priority to U.S. Provisional Application No. 62/331,695, filed May 4, 2016 and entitled "DISPLAY PANEL WITH INTEGRATED SMALL CELL AND BILLBOARD WITH INTEGRATED MACRO SITE," the entire contents of which are incorporated by reference herein for all purposes.

BACKGROUND

Aspects of the present disclosure relate to cellular communications systems, including distributed antenna systems, communications systems that include small cell radio base stations, and communication systems that include macro cell radio base stations.

Cellular communications systems are well known in the art. In a typical cellular communications system, a geographic area may be divided into a series of regions that are referred to as "cells," and each cell is served by a base station. Typically, a cell may serve users who are within a distance of, for example, 2-20 kilometers from the base station, although smaller cells are typically used in urban areas to increase capacity. The base station may include baseband equipment, radios and antennas that are configured to provide two-way radio frequency ("RF") communications with mobile subscribers that are positioned throughout the cell. In many cases, the cell may be divided into a plurality of "sectors," and separate antennas may provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have, in recent years, been deploying so-called "small cell" cellular base stations. A small cell base station refers to a low-power base station that may operate in the licensed and/or unlicensed spectrum that has a much smaller range than a typical "macrocell" base station. A small cell base station may be designed to serve users who are within short distances from the small cell base station (e.g., tens or hundreds of meters). Small cells may be used, for example, to provide cellular coverage to high traffic areas within a macrocell, which allows the macrocell base station to offload much or all of the traffic in the vicinity of the small cell to the small cell base station. Small cells may be particularly effective in Long Term Evolution ("LTE") cellular networks in efficiently using the available frequency spectrum to maximize network capacity at a reasonable cost. Small cell base stations typically employ an antenna that provides full 360 degree coverage in the azimuth plane and a suitable beamwidth in the elevation plane to cover the designed area of the small cell. In many cases, the small cell antenna will be designed to have a small downtilt in the elevation plane to reduce spill-over of the antenna beam of the small cell antenna into regions that are outside the small cell and also for reducing interference between the small cell and the overlaid macro cell.

Cellular operators have also, in recent years, deployed distributed antenna systems (DAS) in which an overall transmitted power may be distributed among several antenna elements which are separated in space. This may serve to improve reliability and usage of resources while maintaining a coverage area, in part because a line-of-sight channel may be present more frequently.

SUMMARY

It has been recognized that some environments where small cells or distributed antenna systems may be placed, such as airports, shopping malls, subway stations, and the like may have aesthetic or design constraints that limit the placement of small cell equipment. For example, many locations within an airport terminal or shopping mall may be sub-optimal to place an antenna for a small cell, either because placement will result in poor service, or because placing the equipment will create an unappealing eyesore. For example, placing an antenna on a ceiling may result in poor antenna performance. This may be because an amount of downtilt is too great, resulting in a smaller coverage area for the small cell. Additionally or alternatively, objects such as intermediate floors, airport equipment, service kiosks, or the like may interfere with a signal path between the ceiling-mounted antenna and user equipment. As another example, placing antennas on the walls or floors of the space may result in unattractive or unappealing equipment placed within a line of sight of individuals traversing the building. In some situations, the equipment may attract unwanted attention, such as persons intentionally or unintentionally tampering with the equipment for various reasons.

The inventors have recognized that digital displays are being used in the environments discussed above with increasing frequency. Some of these digital displays, which may be referred to herein as display panels, are frequently designed to be slightly taller than an average adult human, although the overall size of the display panel may range from several inches in height and width to several meters. In some aspects, the display panel may be dimensioned to provide a desirable advertising effect in which a person may be exposed easily to an advertising subject. For example, as a person walks toward a departure gate, baggage claim, a store, restaurant, rest room, or other destination, products or services advertised on a screen of the digital display may, because of a placement height of the display panel, be placed in a direct line of sight of a person as the person. In some aspects, these displays may include an interactive component, inviting a person to touch one or more portions of the display screen to be entertained temporarily (thus creating a positive association with a product or service) or more frequently to receive additional information about the product or service being advertised.

Additionally, it has been recognized by the inventors that other environments may include larger digital displays than the display panels discussed above. For example, outdoor environments such as those visible to vehicles traveling on highways or other roads may include digital displays that are several times larger than an average adult human and positioned some distance above ground. These larger digital displays may be referred to herein as "digital billboards" to provide some distinction between their smaller "display panel" counterparts, the latter of which may be found more frequently in indoor environments. However, the usage of such nomenclature herein is not intended to limit in anyway the present disclosure, as aspects of the present disclosure are applicable to digital displays regardless of their size. Such digital billboards may be mounted on a pole or a vertical columnar structure. As with the digital panels discussed above, it has been recognized by the inventors that digital billboards may provide a suitable environment for placement of radio equipment, either for a small cell or, in some situations, for a macrocell. This desirability may be because power lines and/or data communication lines may already exist at the installation site to service the digital billboards.

Accordingly, aspects of the present disclosure provide an apparatus, which includes a digital display device comprising a housing and a digital display. The apparatus also includes a small cell base station, which may include at least one antenna and a radio. The small cell base station may be mountable on a top surface of the housing. The at least one antenna and the radio may be surrounded by a fabric radome that may conceal the at least one antenna and radio from view when the small cell base station is mounted to the top surface of the housing.

Additional and alternative aspects of the present disclosure provide an apparatus that may include a digital display device that has a mounting structure and a digital display mounted on the mounting structure. The apparatus may include a base station, which may include at least one antenna, at least one radio, and at least one baseband unit each mounted on the mounting structure. The at least one radio and the at least one baseband unit may be concealed from view by the digital display.

Additional and alternative aspects of the present disclosure provide an apparatus that may include a digital display device, which may include a digital display, and a base station, which may include a radio and at least one antenna mounted on a surface of the digital display device. At least one component of the base station may be concealed from view by a concealment device. In some aspects, this concealment device may be a radome. In some aspects, this concealment device may be the digital display.

DETAILED DESCRIPTION

Figure 1:
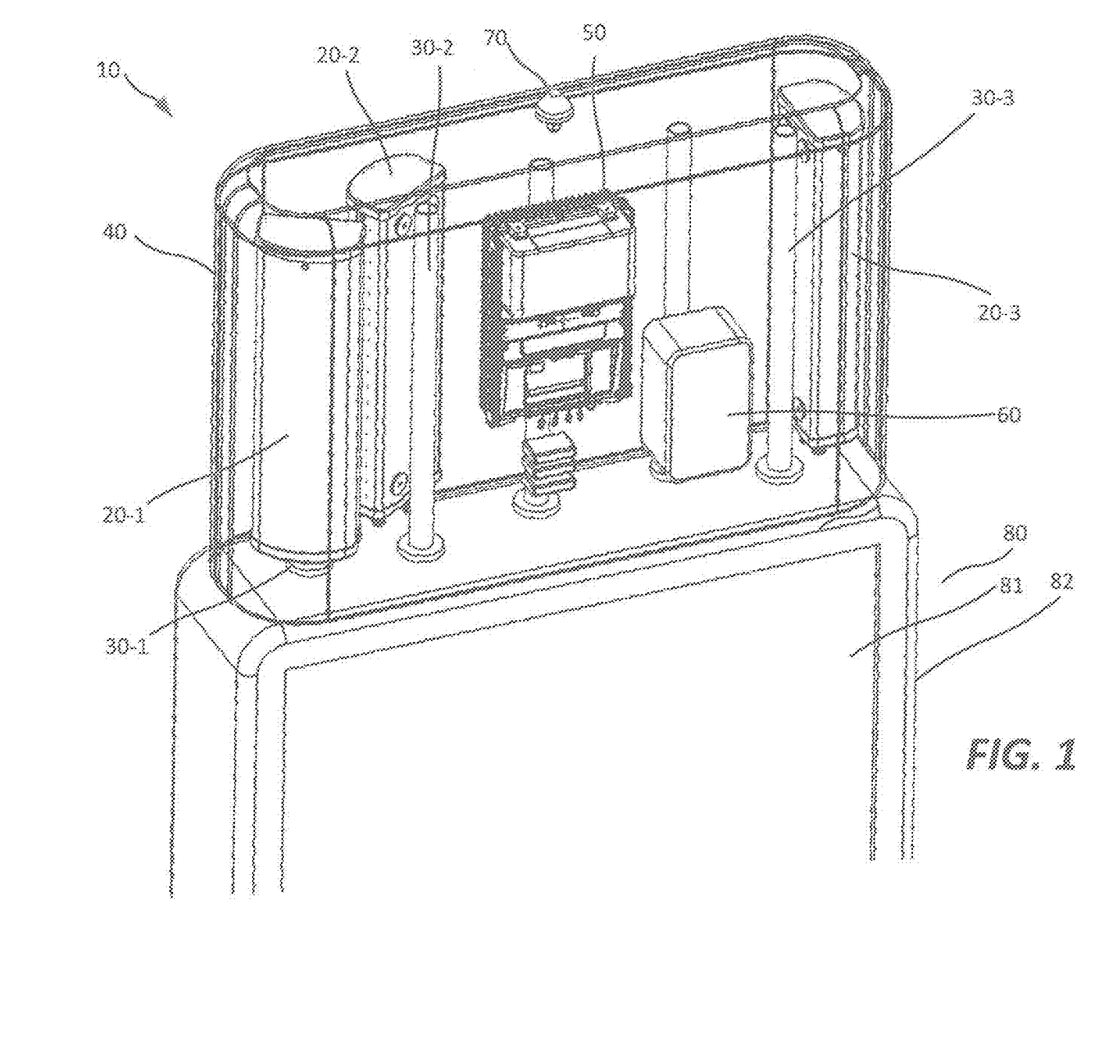
FIGS. 1 and 2 illustrate a front perspective view and a rear perspective view, respectively, of a small cell base station according to one or more aspects.
Figure 2:
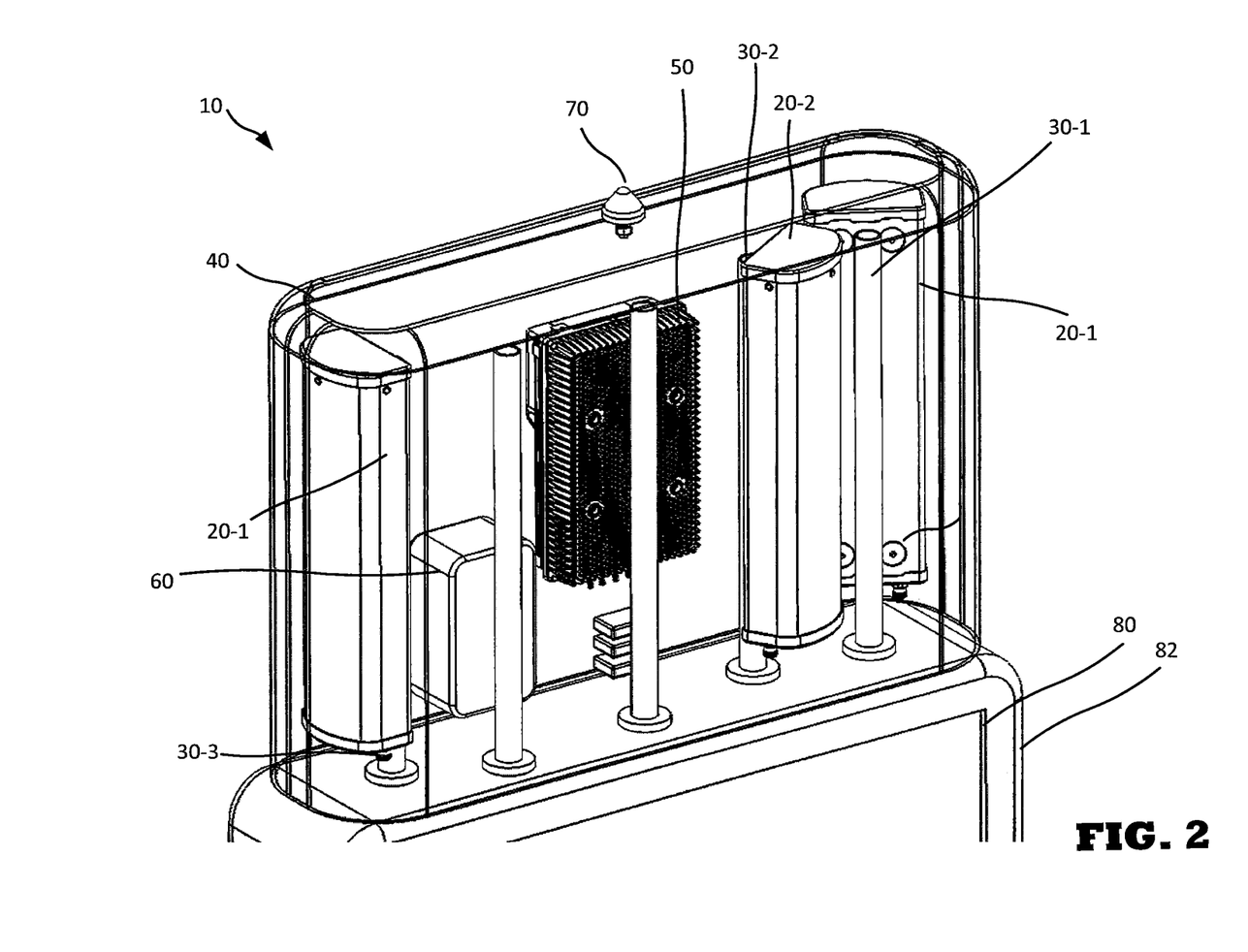
Figure 3:
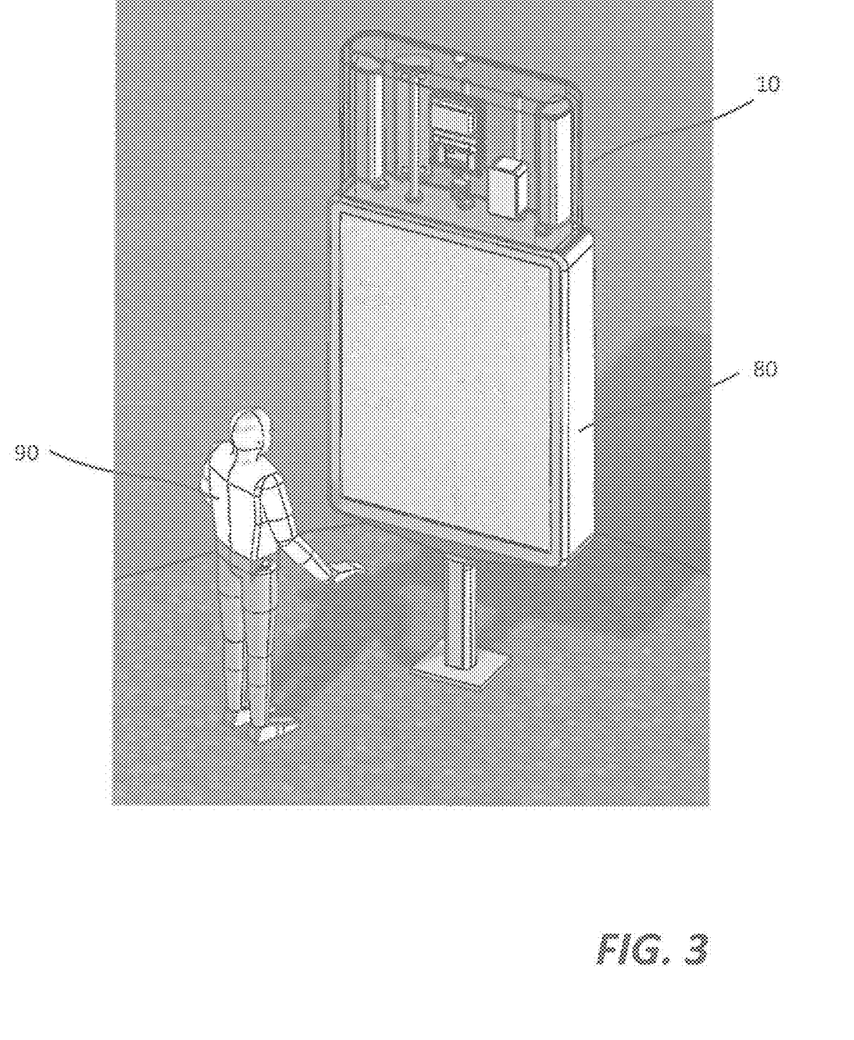
FIG. 3 illustrates relative dimensions of a small cell base station, a display panel device, and an average sized adult human according to aspects of the present disclosure.

Referring to FIGS. 1-3, a small cell base station 10 according to one or more aspects is illustrated. FIG. 1 illustrates a front perspective view of the small cell base station and FIG. 2 illustrates a rear perspective view. Each of FIGS. 1 and 2 illustrate that the small cell base station 10 may be located atop a display panel device 80. FIG. 3 illustrates a rendered view of an exemplary sense of scale of the dimensions of the small cell base station 10 relative to the dimensions of the display panel device 80 and the dimensions of an average sized adult human 90. It is emphasized that such dimensions are exemplary, and the display panel device 80 and/or small cell base station 10 may have different dimensions than those illustrated in FIG. 3.

Referring to FIGS. 1 and 2, the small cell base station 10 may include one or more antennas 20-1, 20-2, and 20-3 that may be mounted on corresponding mounting structures 30-1, 30-2, and 30-3 within a radome 40. Collectively, antennas 20 may have an omni-directional antenna pattern in the azimuth plane, meaning that the antenna beam generated by the one or more antennas 20 may extend through a full 360 degree circle in the azimuth plane. In some aspects, for example where a plurality of antennas are present, each given antenna 20-$n$ may generate an antenna beam which extends only through an arc portion of a full 360 degree circle. For example, as will be discussed in greater detail below, when three antennas 20-1, 20-2, and 20-3 are used, each antenna may have an antenna pattern of one-third of a full 360 degree circle in the azimuth plane, or a beam width of 120 degrees. Each antenna may have a suitable beamwidth (e.g., 10-30 degrees) in the elevation plane. In some aspects, the antenna beam may be slightly down-tilted in the elevation plane to reduce interference with adjacent base stations. In some aspects, small cell base station 10 may be a remote unit in a distributed antenna system (DAS) and the antennas 20-$n$ components thereof.

Mounting structures 30-1, 30-2, and 30-3 may be pole or other columnar mounts on which the antennas may be mounted. Each mounting structure may be configured to provide for azimuth adjustment of the corresponding antenna 20-1, 20-2, and 20-3. For example, each mounting structure may be configured to rotate (via motors not illustrated in FIGS. 1 and 2) about its longitudinal axis, thereby rotating the corresponding antenna 30-1, 30-2, or 30-3 in the azimuth plane. Although FIG. 1 and FIG. 2 illustrate that structures 30-$n$ may be columnar antenna mounts, a wide variety of other mounting techniques may be used to mount the corresponding antenna 20-$n$ within a radome 40. Moreover, although each antenna 20-$n$ is illustrated as substantially parallel to its corresponding mount 30-$n$, in some aspects mechanical downtilt devices (e.g., brackets, adjustments arms, or the like) may be present to provide a mechanical downtilt adjustment of the antenna. Such mechanical downtilt may be in addition to or in the alternative to any electrical downtilt provided by the antennas, a radio 50 (discussed in detail below) and/or other components of small cell base station 10 (e.g., power splitters/combiners and/or phase shifters not illustrated in FIGS. 1 and 2.

The small cell base station 10 may include base station equipment such as baseband units (not shown) and/or radios 50. These may also be positioned within the radome 40, though in some aspects they may be positioned elsewhere and optical fiber or other connections may be used instead. For example, in some aspects radio 50 may be located within radome 40, but in other aspects, radio 50 may be located elsewhere, including within a housing 82 of the display panel device 80. A single radio 50 is shown in FIG. 1 to simplify the drawing, but more than one radio 50 may be provided. In some aspects, the radio 50 may be a remote radio head that is mounted within the radome 40 adjacent the antennas 20, and in such aspects the baseband units or equipment may be located outside the radome 40.

As is known to those of skill in the art, a baseband unit (not shown) may receive data from another source such as, for example, a backhaul network (not shown) and may process this data and provide a data stream to the radio 52. The radio 52 may generate RF signals that include the data encoded therein and may amplify and deliver these RF signals to the antenna 20-1, 20-2, and 20-3 for transmission via respective cabling connections (not shown). In some aspects, a microwave backhaul radio and antenna (not shown) may be included within the small cell base station 10. In such aspects, the radome 40 may be able to pass microwave signals to and from the microwave backhaul antenna and radio. In such aspects circuitry configured to convert signals between the microwave transmission path and the cellular transmission paths may be provided, although not shown in FIGS. 1 and 2.

The radome 40 may be manufactured from a fabric material, including a fabric material especially selected for favorable radio frequency transmission properties. In some aspects, the radome 40 may be screen printed with a neutral color and/or with complementary advertising. In some aspects, the radome 40 may be removable and replaceable without detaching the small cell base station 10 from the display panel, for example to replace one screen printed radome 40 with a second screen printed radome 40 during an advertising refresh.

Also within the radome 40 as a component of the small cell base station 10 is distribution center 60. In some aspects, distribution center 60 may include fiber and power distribution. For example, optical fiber and/or power linkages may be provided to the small cell base station 10 including via display panel device 80 (discussed further below). The optical fiber and/or power linkages may be integrated within the display panel device 80 (e.g., at the time of manufacture) or may be passed through an interior portion or channel of the display panel device 80 at the time of installation of the small cell base station 10 atop the display panel device 80. As another example, which may be used separately from or in conjunction with the fiber and power distribution example, the distribution center 60 may include an alternating current (AC) power and load center. As a third example, which may be used separately from or in conjunction with the examples discussed above, distribution center 60 may provide direct current (DC) rectification. Finally, as a fourth example, which may be used separately from or in conjunction with the examples discussed above, distribution center 60 may include a battery backup for powering the small cell base station 10.

In some aspects, a Global Positioning System (GPS) and/or Indoor Positioning System (IPS) antenna module 70 may be provided within the radome 40 or outside of the radome 40 as required. The GPS/IPS antenna module 70 may be optional. The GPS/IPS antenna module 70 may provide or relay signals to assist a user equipment in determining its position and/or to assist network equipment in determining the position of a user device.

As discussed above, illustrated in FIGS. 1-3 is a display panel device 80, which may include a display panel 81 within a housing 82. The display panel 82 may be a display panel, such as an organic light-emitting diode (OLED), a liquid crystal display (LCD) panel, an electrophoretic display panel, an electrowetting display panel, a plasma display panel (PDP) and so on. However, the display panel 82 is not limited to the aforementioned alternatives and may be implemented in various ways according to the present disclosure. Housing 82 may include the display panel 81 and display circuitry (not shown) configured to drive the display panel 81, though this circuitry may be located outside the housing at a location relatively local to the display panel 81 or remote from the display panel 81.

In some aspects, the display circuitry may include a processor and memory. In some aspects, the display circuitry may be configured to drive signals to the display panel via a driving circuit. In some aspects, the display circuitry may receive data representative of an image (which may be a still image or a video image) from an external device and/or memory (including via a wired or wireless network) and convert or otherwise use the data to display the image on the display panel. In some aspects housing 82 may include multiple display panels 81, each of which may be configured to display the same image or different images. These display panels may be arranged at various locations within the housing 82 and visible through holes or cutouts in the housing 82. For example, a first display panel 81 may be located at a first surface of housing 82, and a second display panel 81 may be located at a second surface of housing 82 opposite from the first display panel 81. As another example, a first display panel 81 may be located at a first surface of housing 82, and a second display panel 81 may be located at a second surface of housing 82 perpendicular from the first display panel 81. As a third example, a first display panel 81 may be located at a first surface of housing 82, and a second display panel 81 may be located at the same first surface of housing 82 as the first display panel 81. Such arrangements are merely exemplary. A display panel 81 may be, in some aspects, at least four feet in height and at least two feet in width, although in other aspects, the display panel 81 may be at least six feet in height and at least four feet in width. Such dimensions are merely exemplary.

Other circuitry dedicated to providing various functionality to the operation of display panel 81 may be provided, either within housing 82 or elsewhere. For example, audio circuitry may be provided, including a speaker within or near housing 82 to provide sound or other auditory accompaniment to visual images displayed on the display panel 81. In some aspects, display panel 81 may be an interactive display panel configured to receive touch or other input from a passerby via interacting circuitry and launch or otherwise enable an interactive session with the passerby. Such functionality may enable the passerby to learn more about a product or service being advertised on the display panel 81.

The dimensions of the small cell base station 10 may be selected to be compatible with existing display panels that are installed in various locations. In some aspects, at least a portion of the small cell base station 10 may be concealed from view by one or more concealment devices, which in this case may be either the display panel device 80 and/or radome 40. In some aspects, some components of the small cell base station 10 may be concealed within display panel device 80 and components of the small cell base station 10 may be concealed by radome 40. For example, antennas 20-1, 20-2, and 20-3, and their corresponding mounting structures 30-1, 30-2, and 30-3 may be concealed within the radome 40, and radio 50 may be concealed by display panel device 80. As used herein, "concealed" or "concealed from view" may include the shielding of an a device or component, including its electrical components and any housing surrounding such electrical components, from view by an observer.

The small cell base station 10 of FIG. 1 may include various other equipment such as, for example, a power supply, back-up batteries, a power bus, Antenna Interface Signal Group ("AISG") controllers and the like that are not illustrated in FIG. 1. In some aspects, these may be located within the housing 82 of the display panel device 80, although in some aspects, the small cell base station 10 may be installed as a retro-fit module and/or as an add-on module atop an already installed display panel device 80. In such aspects, the small cell base station 10 may be configured to receive operational power from the display panel device 80 (for example, via a power port installed or located on a top surface of the display panel device 80). In other words, in some aspects, the display panel device 80 and the small cell base station 10 may be powered in common, and the display panel device 80 may act as a pass-through to empower the small cell base station 10.

Figure 4:
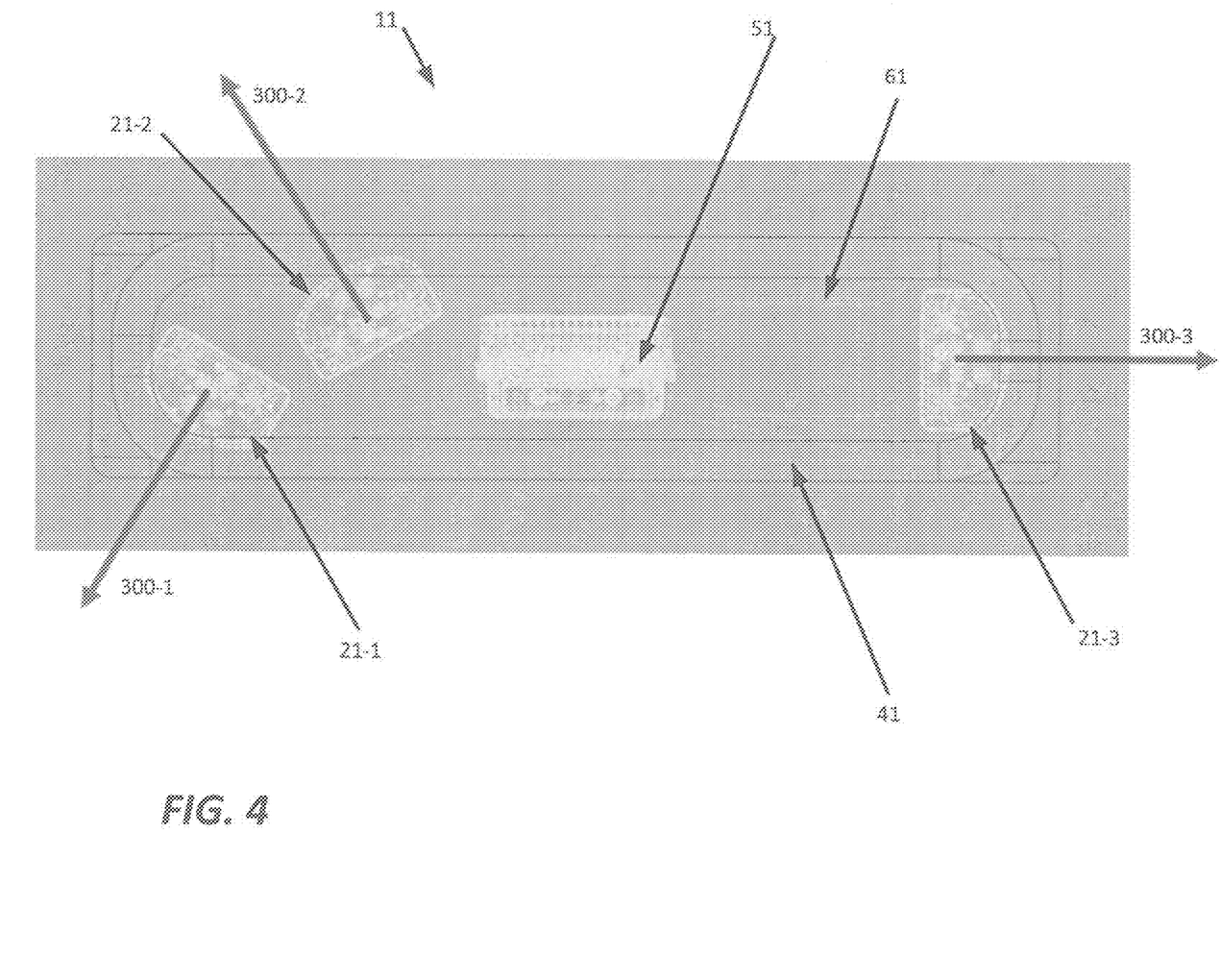
FIG. 4 illustrates a plan view of a first small cell base station according to aspects of the present disclosure.

FIG. 4 illustrates a first plan view of a small cell base station 11 according to aspects of the present disclosure. It may be seen in FIG. 4 that, in a first arrangement, the small cell base station 11 may include antennas 21-1, 21-2, and 21-3, which may be the same as those discussed above with respect to FIGS. 1 and 2. In other words, antennas 21-1, 21-2, and 21-3 may be the same as antennas 20-1, 20-2, and 20-3 discussed above and small cell base station 11 may be the same as small cell base station 10 discussed above.

As discussed above, in some aspects, omni-directional antenna beams may be desired as they may provide coverage of relatively uniform gain within a geographical area serviced by the small cell base station. To provide such coverage, in some aspects, multiple antennas (e.g., antennas 21-1, 21-2, and 21-3) may be used, and each antenna may generate antenna beams that are directed into a portion of the geographical area. For example, when three antennas are used, each antenna may have an antenna pattern of one third of a full 360 degree circle in the azimuth plane, or a beam width of 120 degrees.

In some aspects, the area within a radome 41 of the small cell base station 11 may be constrained by external dimensions, for example the width and thickness (e.g., the footprint) of a display panel device 80 on which the small cell base station 11 is mounted. It may be desirable for a footprint of the small cell base station 11 to be smaller than a footprint of the display panel to conceal or otherwise limit the visibility of the small cell base station mounted 11 at the top of the display panel device 80.

Therefore, in some aspects, internal dimensions of the small cell base station may be constrained, and it follows may not be possible to mount antennas 21-1, 21-2, and 21-3 to provide the omni-directional antenna beams discussed above. For example, the dimensions and placement of radio 51 and distribution center 61 within radome 41 may limit the number and placement of antennas within the radome, including limiting the number and placement of antennas 21-1, 21-2, and 21-3 to that shown in FIG. 4.

The antennas 21-1, 21-2, and 21-3 may provide, in lieu of uniform omni-directional antenna coverage, a quasi-omni directional coverage area where antenna beams are generated by a plurality of antennas that cover a full 360 degrees surrounding the small cell base station 11. In FIG. 4, arrows 300-1, 300-2, and 300-3 may represent directions of antenna beams that radiate from respective antennas 21-1, 21-2, and 21-3. These antenna beams may provide a "quasi-omni" directional pattern in the azimuth plane generated by the antennas 21-1, 21-2, and 21-3.

In some aspects, gain of the generated antenna beams may be variable across the 360 degrees in the azimuth plane, although in some aspects, the gain of the generated antenna beams may be nearly constant through usage of other gain-adjusting devices or techniques. For example, the three antennas 21-1, 21-2, and 21-3 may be configured independently of each other (e.g., different apertures, different number or spacing of radiating elements or dipoles within the antennas, or adjustment of other configurable components to increase power or current density) to provide a selected gain from each of antennas 21-1, 21-2, and 21-3 or the collective output of antennas 21-1, 21-2, and 21-3 taken together. In some aspects, the three antennas 21-1, 21-2, and 21-3 may be identical antennas configured identically, and gain in some areas of the small cell may be lower than gain in other areas of the small cell, with the understanding that other local antennas in a distributed antenna system, and/or a macro cell serving the area in common with the small cell, may make up any necessary or desired difference. In some aspects, other components of the small cell base station 11, such as combiners (not shown) may operate to provide a full coverage quasi-omni antenna.

Figure 5:
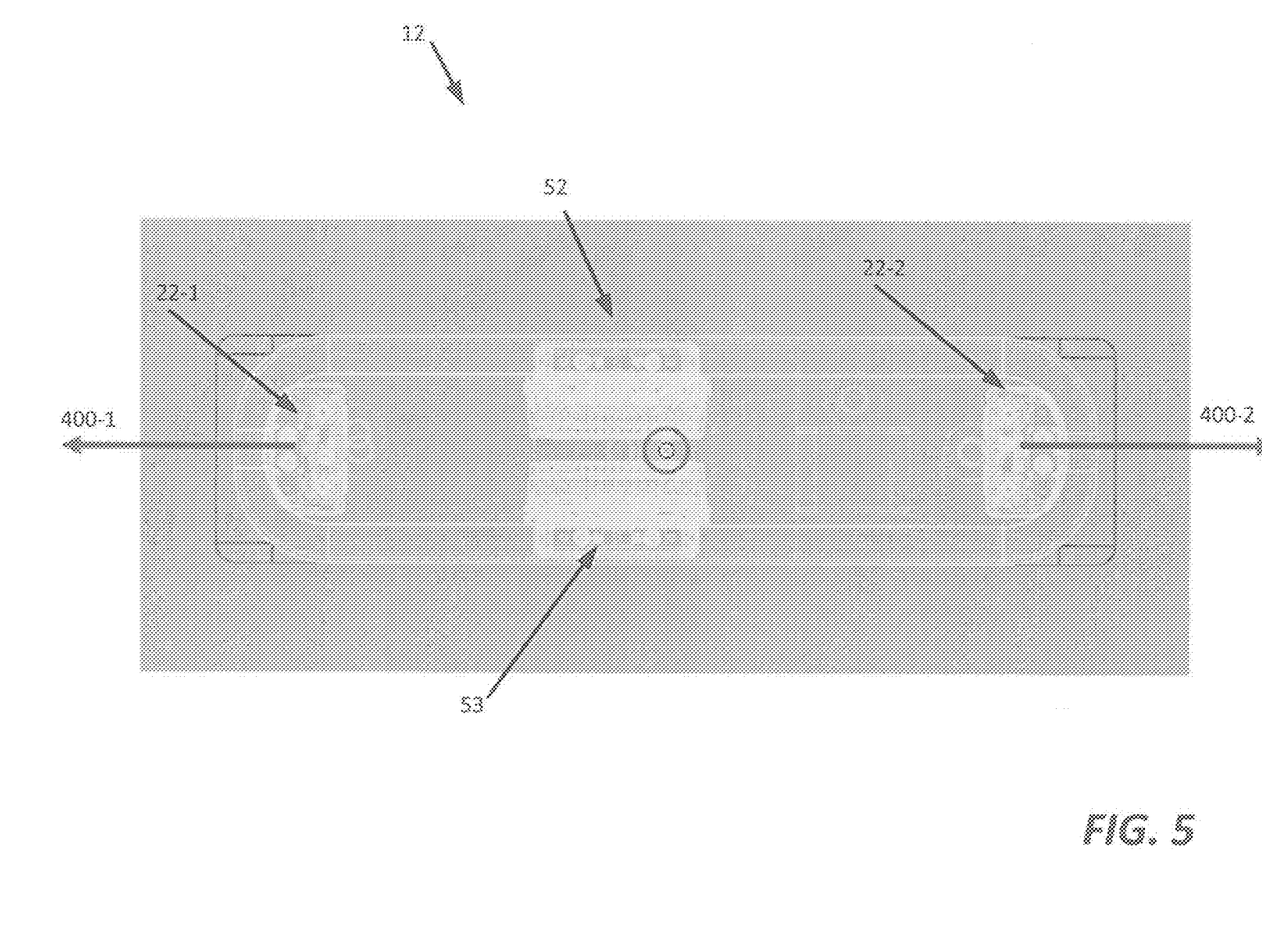
FIG. 5 illustrates a plan view of a second small cell base station according to aspects of the present disclosure.

FIG. 5 illustrates a plan view of a second small cell base station 12, according to aspects of the present disclosure. In contrast to the first small cell base station 11 discussed above with respect to FIG. 4, the small cell base station 12 illustrated in FIG. 5 includes a first radio 52 and a second radio 53. Instead of the three antennas shown above, two antennas 22-1 and 22-2 are provided. These antennas may be arranged such that they provide back-to-back dual sector coverage (e.g., each antenna may provide approximately 180 degrees of coverage within a geographical area serviced by the small cell base station 12.) First antenna 22-1 may be coupled to first radio 52 and second radio 53 may be coupled to second antenna 22-2. Such coupling and deployment of one radio per antenna may provide increased gain and allow for frequency reallocation between a first sector (illustrated by arrow 400-1) and a second sector (illustrated by arrow 400-2).

Figure 6:
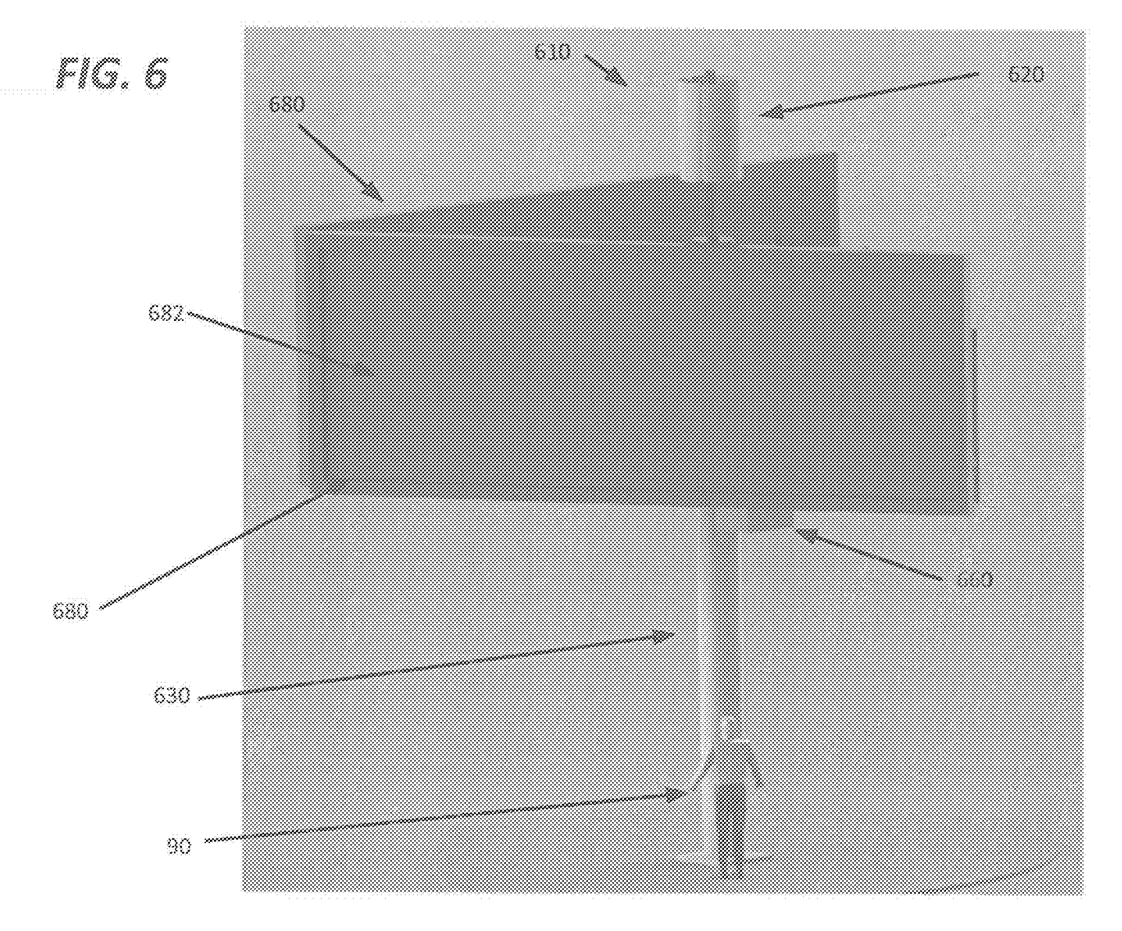
FIG. 6 illustrates relative dimensions of a base station, a digital billboard device, and an average sized adult human according to aspects of the present disclosure.

As discussed above, other environments than those previously discussed may include larger digital displays referred to herein as "digital billboards." These environments may include outdoor environments such as those visible to vehicles traveling on highways or other roads. FIG. 6 illustrates a rendered view of two digital billboard devices 680 and provides an exemplary comparison in dimensions of the digital billboard devices 680 and an average adult human 90. As may be seen, the digital billboard devices 680 may include digital displays 682 (of which only one is visible in FIG. 6) that are several times larger than the average adult human 90 and that are positioned some distance above ground. The digital billboard devices 680 may be mounted on a columnar mount, vertical pole, or the like, as demonstrated by mounting structure 630.

Figure 7:
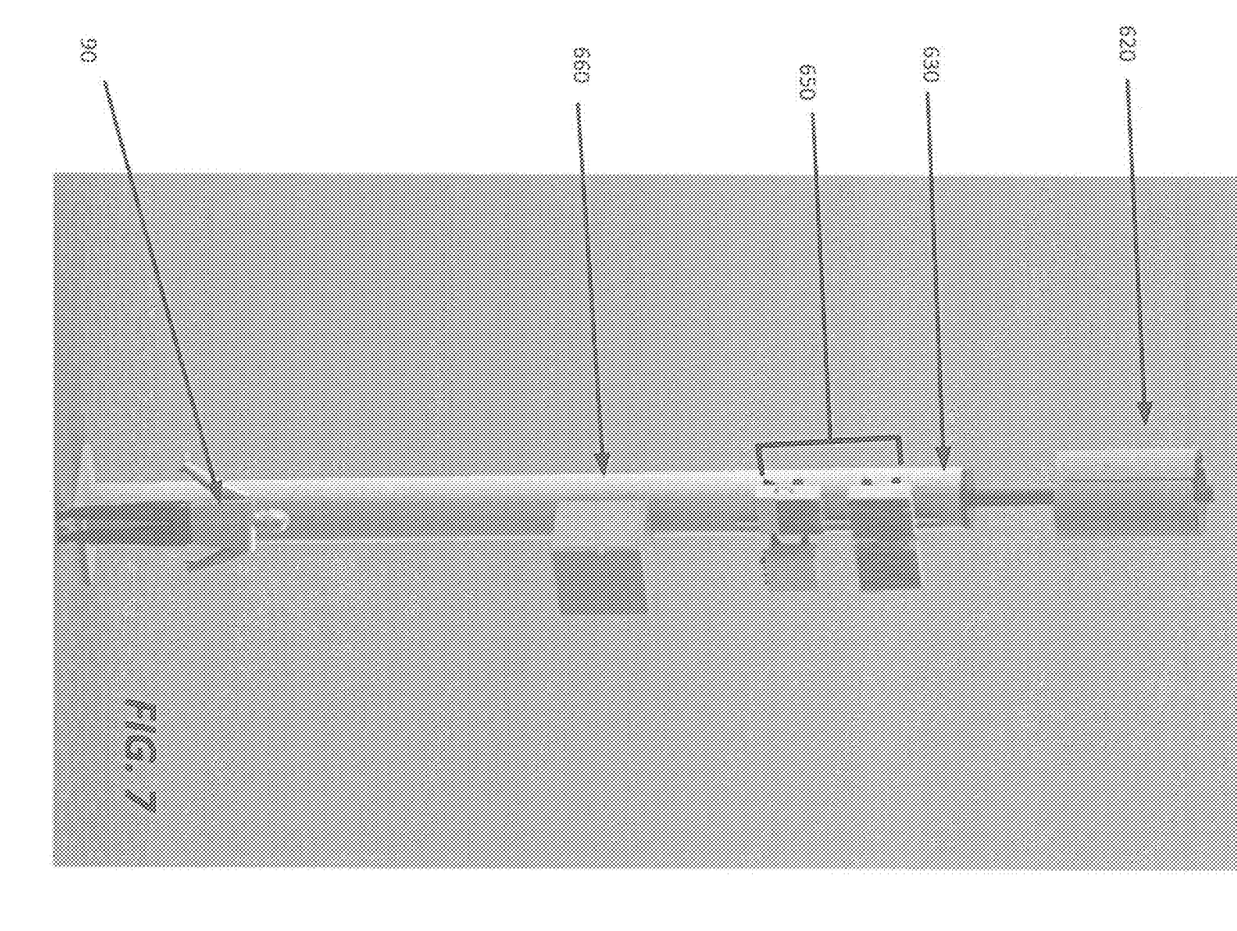
FIG. 7 illustrates components of a base station at least partially concealed by digital billboard devices according to aspects of the present disclosure.

In accordance with aspects of the present disclosure, illustrated in FIG. 6 and in FIG. 7 are components of a base station 610. FIG. 7 illustrates the base station 610 and mounting structure 630, with the digital billboard devices 680 removed for clarity in understanding that which is concealed by the digital billboard devices. As with the small cell base station 10 discussed above with reference to FIG. 7, at least a portion of the base station 610 is concealed by a concealment device, which in the case of the base station 610 are the digital billboard devices 680 themselves.

The base station 610 may include an antenna module 620, which may in some aspects include a concealed antenna module. The antenna module 620 may include one or more antennas, which collectively may have an omni-directional antenna pattern in the azimuth plane, meaning that the antenna beam generated by the one or more antennas of antenna module 620 may extend through a full 360 degree circle in the azimuth plane. In some aspects, for example where a plurality of antennas are present, each given antenna may generate an antenna beam which extends only through an arc portion of a full 360 degree circle. For example, when three antennas are used, each antenna may have an antenna pattern of one-third of a full 360 degree circle in the azimuth plane, or a beam width of 120 degrees. Each antenna may have a suitable beamwidth (e.g., 10-30 degrees) in the elevation plane. In some aspects, the antenna beam may be slightly down-tilted in the elevation plane to reduce interference with adjacent base stations. The antenna module may be mounted at the top of the mounting structure 630. As with the antennas discussed above with respect to FIG. 1, although the antenna module 620 is illustrated as coaxial with the mounting structure 630, in some aspects, mechanical downtilt devices may be used to angle one or more of the antennas of the antenna module 620 to provide downtilt.

The base station 610 may also include a radio 650. Although illustrated as a single device, in some aspects multiple devices may be used. This radio 650 may include base station equipment such as a radio, but may also include power and optical fiber components. In some aspects, the radio 650 may include a radio/power/fiber module. A single radio 650 is shown in FIG. 7 to simplify the drawing, but more than one radio may be provided. In some aspects, the radio 650 may be a remote radio head that is mounted on mounting structure 630.

The radio 650 may communicate (via optical fibers, coaxial cables, or the like) with a baseband unit 660. In some aspects, the baseband unit 660 may be mounted to the mounting structure 630. Such a configuration may be referred to as a "zero footprint" configuration, because the antenna module, radio, and baseband unit are each mounted to mounting structure 630. The baseband unit 660 may send and receive data to and from another source such as, for example, a backhaul network (not shown) and may process this data and provide a data stream to the radio 650. The radio 650 may generate RF signals that include the data encoded therein and may amplify and deliver these RF signals to the antenna module for transmission via respective cabling connections (not shown).

In some aspects, a microwave backhaul radio and antenna (not shown) may be included within the base station 610. In such aspects circuitry configured to convert signals between the microwave transmission path and the cellular transmission paths may be provided, although not shown in FIG. 7.

The small cell base station 610 of FIG. 7 may include various other equipment such as, for example, a power supply, back-up batteries, a power bus, Antenna Interface Signal Group ("AISG") controllers and the like which are not illustrated in FIG. 7. In some aspects, these may be mounted at various locations on mounting structure 630, or may be located within baseband unit 660 (which may include a cabinet). In some aspects, the base station 610 may be installed as a retro-fit module and/or as an add-on module atop an already installed digital billboard device 680. In such aspects, that the base station 610 may be configured to receive operational power from the digital billboard devices 680 (for example, via a power connection available from mounting structure 630 and/or digital billboard device 680). In other words, in some aspects, the digital billboard devices 680 and the base station 610 may be powered in common, and the digital billboard devices 680 may act as a passthrough to empower the base station 610. The base station 610 may be a small cell base station, macrocell base station, or other base station. A digital billboard device 680 may be, in some aspects, at least ten feet in height and at least thirty feet in width, although in other aspects, the display panel 681 may be at least fourteen feet in height and at least forty-eight feet in width. Such dimensions are merely exemplary.

Aspects of the present disclosure have been described above with reference to the accompanying drawings. The present disclosure is not limited to the illustrated embodiments; rather, these embodiments are intended to fully and completely convey to those skilled in this art how to make and use the teachings of the present disclosure. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of devices described herein in use or operation in addition to the orientation depicted in the figures. For example, if a device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

What is claimed is:

1. An apparatus comprising:
   a cellular small cell base station comprising at least one antenna, a radio, and a communication link from the radio to a baseband unit that is configured to communicate via a baseband network, wherein the cellular small cell base station is configured to provide cellular service within a distance of the cellular small cell base station; and
   a fabric radome configured to attach to the cellular small cell base station such that the fabric radome conceals from view the at least one antenna, the radio, and a portion of the communication link,
   wherein the cellular small cell base station is configured to mount to a top surface of a housing of a digital display device and comprising a digital display.

2. The apparatus of claim 1, wherein the at least one antenna comprises a plurality of antennas arranged to provide a quasi-omni directional antenna beam in an azimuth plane.

3. The apparatus of claim 2, wherein the plurality of antennas comprises a first antenna, a second antenna, and a third antenna.

4. The apparatus of claim 1, wherein the at least one antenna comprises a motorized vertical pole, wherein the motorized vertical pole is configured to rotate about a longitudinal axis of the motorized vertical pole, and wherein the fabric radome is configured to attach to the cellular small cell base station such that the fabric radome conceals from view the motorized vertical pole.

5. The apparatus of claim 1, wherein the fabric radome is configured to detach from the cellular small cell base station without removing the cellular small cell base station from the housing.

6. The apparatus of claim 1, wherein the digital display device is configured to provide pass-through power to the cellular small cell base station.

7. The apparatus of claim 1, wherein the cellular small cell base station further comprises a Global Positioning System (GPS) module.

8. The apparatus of claim 1, wherein the radio comprises a first radio and a second radio, and wherein the at least one antenna comprises a first antenna coupled to the first radio and a second antenna coupled to the second radio, and wherein the first antenna and the second antenna are arranged to provide back-to-back sectorial coverage in an azimuth plane.

9. The apparatus of claim 1, wherein the baseband unit comprises a microwave backhaul antenna and wherein the baseband network comprises a microwave network.

10. An apparatus comprising:
a digital display device comprising a housing and a digital display at least two feet in a first dimension positioned within the housing; and
a cellular small cell base station comprising a plurality of antennas, a radio, and a communication link to a backhaul network, wherein the cellular small cell base station is configured to provide cellular service within a distance of the cellular small cell base station;
wherein the cellular small cell base station is configured to mount to a top surface of the housing;
wherein the cellular small cell base station comprises a fabric radome that surrounds the plurality of antennas, the radio, and a portion of the communication link such that the plurality of antennas and the radio are concealed from view when the cellular small cell base station is mounted to the top surface of the housing,
wherein the plurality of antennas are arranged to provide a quasi-omni directional antenna beam in an azimuth plane, and
wherein the digital display device is configured to provide pass-through power to the cellular small cell base station.

11. The apparatus of claim 1, wherein the communication link comprises an optical fiber.

12. The apparatus of claim 9, wherein the fabric radome is configured to attach to the cellular small cell base station such that the fabric radome conceals from view the microwave backhaul antenna.

* * * * *